C. E. RUSSELL & T. M. KEITH.
ANTISKID ATTACHMENT FOR WHEEL TIRES.
APPLICATION FILED JULY 26, 1909.

991,895.

Patented May 9, 1911.

Witnesses:
C. W. Lovell
W. J. Kingsley

Inventors
Clarence E. Russell
By Attorney Thos. M. Keith
Wm Bodge

UNITED STATES PATENT OFFICE.

CLARENCE E. RUSSELL AND THOMAS M. KEITH, OF BROOKLYN, NEW YORK.

ANTISKID ATTACHMENT FOR WHEEL-TIRES.

991,895.      Specification of Letters Patent.      Patented May 9, 1911.

Application filed July 26, 1909. Serial No. 509,639.

*To all whom it may concern:*

Be it known that we, CLARENCE E. RUSSELL and THOMAS M. KEITH, citizens of the United States, and residents of Brooklyn, in the county of Kings and State of New York, have invented certain new and useful Improvements in Antiskid Attachments for Wheel-Tires, of which the following is a specification.

The invention relates to improvements in antiskid attachments for wheel-tires; and the object of the same is to provide a simple and effective device, readily renewable and interchangeable in its corresponding parts and adapted for detachable engagement to the tire; and further objects include certain details of construction hereinafter set forth.

Figure 1:
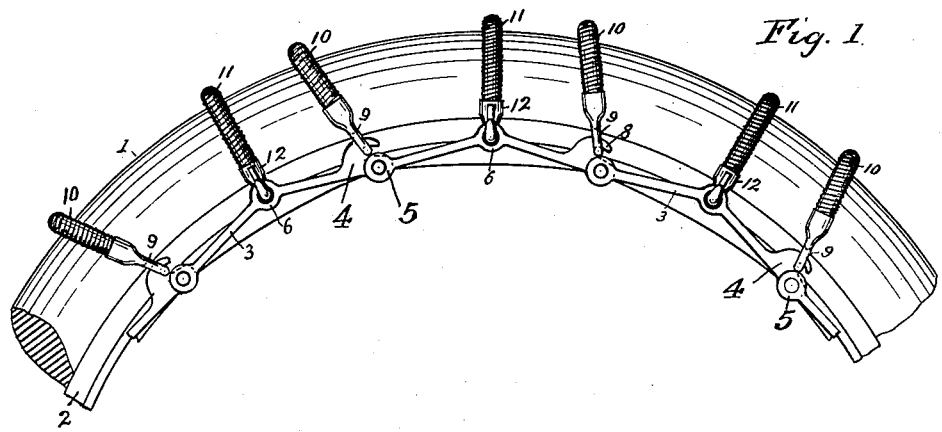
Figure 3:
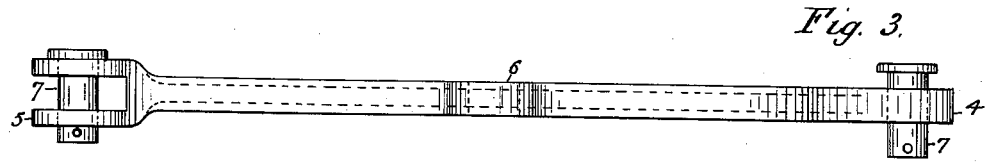
Figure 2:
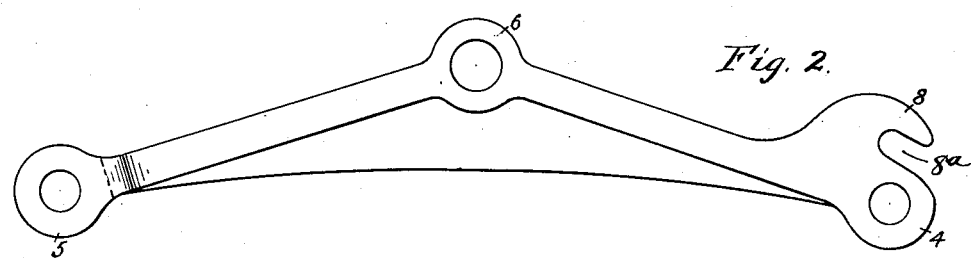

In describing the invention in detail reference is had to the accompanying drawings, forming part of this specification, and wherein like characters of reference are used to designate like parts throughout the several views, and in which:

Figure 1 is a side elevation of a portion of a wheel-tire provided with the antiskid attachment embodied in the present invention; and Figs. 2 and 3 respectively show a side and an edge view of a single link of the detachable chain structure.

In the drawings, numeral 1 designates a common form of tire-section, secured in the usual manner to a wheel-rim 2, on opposite sides of which are disposed a pair of similar chain structures composed of like and interchangeable links 3, having at one end the tongue connection 4, and at the opposite end the fork connection 5, and provided with the intermediate eye connection 6. Through perforations in the connection-ends of the links extend the studs or pins 7, which serve to detachably connect the tongue and fork ends of the adjacent links. The tongue ends of the several links are formed with enlargements constituting hooks 8, each provided with an extended open end parallel slot $8^a$, the lower face of which extends below the periphery of the circular fork end of the connected adjacent link to form therewith a lock for retaining the coupling eye or end 9, secured to the flexible wear member 10. These wear members are preferably formed of Manila hemp rope to protect the tire against injury, their ends being provided with similar couplings to engage the hooks of the oppositely disposed chains. The wear members 10 loosely extend transversely across the face or tread of the tire and by their slack relation therewith present wearing surfaces adapted to bear upon the tire at variable points to minimize the wearing action thereon.

Between the wear members 10 and closely embracing the face of the tire are the intermediate flexible retaining members 11, having the snap-hook couplings 12 of well-known construction secured to their ends for engagement with the eye-connections 6 of the chain-links. These intermediate members are likewise formed of hemp rope and have the double function of retaining the chains in position and for presenting an additional wear or antiskidding surface.

The particular advantage in the rope construction of the members 10 and 11 resides in its ability for a given weight of material to withstand the sudden shocks and stresses incident to ordinary use, as against the well-known chain-constructed members used for this purpose. In practice the rope-material is of the tarred variety in order to withstand the action of dampness and to further increase its resistance to wear.

By means of the studs 7, which are provided with the usual heads and cotter-pins, the links may be detachably connected for permitting the disengagement and replacement of the several flexible wear members, and it will be evident that upon the connection of the links, the ends of the slots in the hook-connections 8 will be partially closed and will prevent the displacement of the coupling-ends of the wear members 10.

It is to be understood that while we illustrate and describe the preferred embodiment of the invention, it is susceptible of various changes as regards its form, proportions, detail construction, and arrangement of parts without departing from the essential spirit and scope or sacrificing any of the advantages of the invention.

What we claim as our invention and desire to secure by Letters Patent, is:—

1. The combination with a wheel-tire, chain structures disposed on opposite sides thereof and comprising interchangeable links having tongue and fork connection ends formed thereon, hooks formed on one end of the said links and having an open-ended slot therein adapted to be partially closed by the connection end of the adjacent link, eye-connections formed on said links intermediate of their ends, and flexible antiskid members having coupling-ends engaging the hooks and the eye-connections formed on the links of said chain.

2. The combination with a wheel-tire, chain structures disposed on opposite sides thereof and comprising interchangeable links having tongue and fork connection-ends formed thereon, hooks formed on one end of the said links and having an open-ended slot therein adapted to be partially closed by the connection end of the adjacent link, eye-connections formed on said links intermediate of their ends, flexible antiskid members loosely extending across the face of the tire and having coupling-ends engaging the hooks formed on the oppositely-disposed chains, and flexible antiskid members engaging the eye-connections on the oppositely-disposed chains and extending across the face of said tire in close engagement therewith.

Signed at New York in the county of New York and State of New York this twenty-fourth day of July A. D. 1909.

CLARENCE E. RUSSELL.
THOMAS M. KEITH.

Witnesses:
THELMA H. FARRELL,
OLIVER R. GRANT.